(12) United States Patent
Mao et al.

(10) Patent No.: US 11,664,540 B2
(45) Date of Patent: May 30, 2023

(54) POWER TOOL SYSTEM AND BATTERY PACK THEREOF

(71) Applicant: Globe (Jiangsu) Co., Ltd., Jiangsu (CN)

(72) Inventors: Wei Mao, Jiangsu (CN); Chuanjun Liu, Jiangsu (CN)

(73) Assignee: Globe (Jiangsu) Co., Ltd., Jiangsu (CN)

(*) Notice: Subject to any disclaimer, the term of this patent is extended or adjusted under 35 U.S.C. 154(b) by 644 days.

(21) Appl. No.: 16/700,257

(22) Filed: Dec. 2, 2019

(65) Prior Publication Data

US 2020/0176827 A1 Jun. 4, 2020

(30) Foreign Application Priority Data

Nov. 30, 2018 (CN) .......................... 201811455282.9

(51) Int. Cl.
| | | |
|---|---|---|
| *H01M 10/42* | (2006.01) | |
| *H01M 50/209* | (2021.01) | |
| *H01M 50/502* | (2021.01) | |
| *H01M 50/213* | (2021.01) | |
| *H01M 50/247* | (2021.01) | |

(Continued)

(52) U.S. Cl.
CPC ..... *H01M 10/4257* (2013.01); *H01M 50/213* (2021.01); *H01M 50/247* (2021.01); *H01M 50/269* (2021.01); *H01M 50/271* (2021.01); *H01M 50/503* (2021.01); *H01M 50/519* (2021.01); *H01M 2010/4271* (2013.01); *H01M 2220/30* (2013.01)

(58) Field of Classification Search
CPC .......... H01M 10/4257; H01M 50/209; H01M 50/502; H01M 2010/4271; H01M 2220/30; H01M 50/213; H01M 50/247; H01M 50/269; H01M 50/271; H01M 50/503; H01M 50/519; H01M 10/42; Y02E 60/10; B25F 5/02

See application file for complete search history.

(56) References Cited

U.S. PATENT DOCUMENTS

| | | |
|---|---|---|
| 7,397,219 B2 | 7/2008 | Phillips et al. |
| 9,583,745 B2 | 2/2017 | White et al. |

(Continued)

*Primary Examiner* — Lisa S Park
(74) *Attorney, Agent, or Firm* — Rooney IP, LLC

(57) ABSTRACT

A power tool system includes a first and second power tools with different rated-voltages and a battery pack supplying power to the corresponding power tool. The battery pack has a battery module with two battery cell groups and a female connector having four conductive terminals respectively connected to positive and negative electrodes of two battery cell groups. The female connector has a converter switching the connection of two battery cell groups between parallel connected state to isolated connected state through connecting or disconnecting two conductive terminals with same polarity together. The first power tool includes a first male connector connected to the female connector to connect two battery cell groups in series through connecting two conductive terminals with different polarities together. The second power tool has a second male connector coupled to the female connector to connect two battery cell groups in parallel through connecting two conductive terminals with same polarity together.

13 Claims, 11 Drawing Sheets

(51) Int. Cl.
  *H01M 50/271*  (2021.01)
  *H01M 50/503*  (2021.01)
  *H01M 50/519*  (2021.01)
  *B25F 5/02*  (2006.01)
  *H01M 50/269*  (2021.01)

(56) References Cited

U.S. PATENT DOCUMENTS

2011/0250484 A1   10/2011  Meng
2014/0017533 A1*  1/2014   Nishihara ........... H01M 50/519
                                               429/93
2016/0126533 A1*  5/2016   Velderman ............... H02J 7/02
                                               429/97
2017/0072553 A1   3/2017   Bakker
2019/0259984 A1*  8/2019   Nishikawa ............... B25F 5/02

\* cited by examiner

POWER TOOL SYSTEM AND BATTERY PACK THEREOF

CROSS-REFERENCE TO RELATED APPLICATIONS

This application is a US application which claims the priority of CN Application Serial No. 201811455282.9, filed on Nov. 30, 2018, the disclosures of which are hereby incorporated by reference in their entirety.

TECHNICAL FIELD

The present invention relates to a power tool system and battery pack thereof.

BACKGROUND

Battery pack as a rechargeable power source is increasingly used for supplying power for outdoor tools, especially for cordless power tools. It's very convenient to use Lithium-ion battery pack as an energy source to drive a motor of the power tool because the battery pack can be removed from the tools and rechargeable by an external charging device. Because the motor of the cordless power tool has a rated voltage and needs to be driven by a corresponding battery pack which can output the corresponding voltage, and different cordless power tools have different rated-voltage motors, so a plurality of battery packs which supply different voltages for corresponding tools need to be carried when the worker operates different cordless power tools in the outdoors. It's very inconvenient for the operator because of the larger load caused by the battery packs.

SUMMARY OF THE INVENTION

An object of the present invention is to provide a battery pack and a power tool system having the battery pack.

According to an aspect of the present invention, the object is achieved through a battery pack, comprising: a lower cover; an upper cover mounted on the lower cover; a battery module received in a receiving space formed between the upper and lower covers and having two battery cell groups, each battery cell group including a plurality of battery cells connected in series and having a positive electrode and a negative electrode; a circuit board assembled to the battery module and electrically connected to the positive and negative electrodes of two battery cell groups; and a female connector mounted to the circuit board and having a plurality of conductive terminals respectively and electrically connected to positive and negative electrodes of two battery cell groups; the electrical connection of two battery cell groups being switched between parallel connected state and isolated state through respectively connecting or disconnecting two conductive terminals with same polarity together.

In an exemplary embodiment, the female connector includes a converter received therein, and the converter slides towards or away from the conductive terminals to connect or disconnect two conductive terminals with same polarity together.

In an exemplary embodiment, the female connector includes a housing mounted on the circuit board, the conductive terminals are received in the housing and respectively and electrically connected to the positive and negative electrodes of two battery cell groups through the circuit board, the converter is slidably assembled in the housing and opposite to the conductive terminals.

In an exemplary embodiment, two conductive terminals with same polarity are connected with each other in the female connector through the converter.

In an exemplary embodiment, the converter includes a main body and a plurality of inner contacts received in the main body, and each inner contact is simultaneously connected to two conductive terminals with same polarity.

In an exemplary embodiment, the inner contacts can be separate with the conductive terminals to isolate two battery cell groups when the main body is driven to move away from the conductive terminals.

In an exemplary embodiment, the converter further has a plurality of elastic members sandwiched between the main body and one sidewall of the housing, and the elastic member is compressed and deformed when the main body is driven to move away from the conductive terminals, and the main body moves towards the conductive terminals under the elastic force caused by the elastic member recovering from elastic deformation.

In an exemplary embodiment, the inner contacts are connected with the conductive terminals when the main body is driven to move towards the conductive terminals and are separated with the conductive terminals when the main body is driven to move away from the conductive terminals.

In an exemplary embodiment, the housing has a guiding rail extending along a length direction thereof for guiding the converter to move towards or away from the conductive terminals.

In an exemplary embodiment, the main body has a protruding portion corresponding to the guiding rail of the housing, and the protruding portion extending forwardly from the main body, and a pair of ribs are formed in the housing and located at two opposite sides of the guiding rail.

In an exemplary embodiment, the housing defines a plurality of positioning columns extending towards the conductive terminals from the sidewall thereof, and the main body has a plurality of posts extending therefrom, and each elastic member is sandwiched between the corresponding positioning column and corresponding post.

In an exemplary embodiment, the post is configured with a hollow cylinder shape for receiving one end of the elastic member, and the other end of the elastic member is surrounded around the corresponding positioning column and abuts against the sidewall of the housing, and the posts and the protruding portion are located at two opposite sides of the main body.

In an exemplary embodiment, each conductive terminal has a contacting portion electrically connected with the inner contact and a clamping portion disposed opposite to the contacting portion, and each inner contact is simultaneously connected with the contacting portions of two adjacent conductive terminals with same polarity.

In an exemplary embodiment, the contacting portion is the contacting arm, and the clamping portion is the clamping arm opposite to the contacting arm, and each inner contact defines a pair of connecting arms, and each connecting arm is respectively connected with corresponding contacting arm of corresponding conductive terminals.

In an exemplary embodiment, the conductive terminals are disposed from left to right, and the conductive terminals with same polarity are located at the same side, and each conductive terminal defines a contacting pin extending downwardly therefrom for being soldered to the circuit board.

According to an aspect of the present invention, the object is also provide a power tool system, comprising: a first power tool with a first rated-voltage having a first male connector; a second power tool with a second rated-voltage having a second male connector; and a battery pack supplying power to the first or second power tool connected thereto, including: an upper cover; a lower cover; a battery module received in a receiving space formed between the upper and lower covers and having two battery cell groups each including a plurality of battery cells connected in series, each battery cell group having a positive electrode and a negative electrode; a circuit board assembled to the battery module and electrically connected to the positive and negative electrodes of two battery cell groups; and a female connector mounted to the circuit board and having a plurality of conductive terminals respectively and electrically connected to positive and negative electrodes of two battery cell groups; the electrical connection of two battery cell groups being switched between parallel connected state and isolated state through respectively connecting or disconnecting two conductive terminals with same polarity together, and the battery pack outputting a first voltage for the first power tool when the female connector being coupled to the first male connector and outputting a second voltage for the second power tool when the female connector being coupled to the second male connector.

In an exemplary embodiment, the first male connector has one connecting terminal corresponding to two conductive terminals with different polarities, and the connecting terminal is simultaneously electrically connected two conductive terminals with different polarities to connect two battery cell groups in series when two conductive terminals with same polarity are disconnected with each other.

In an exemplary embodiment, the first male connector has two conducting terminals corresponding to the rest two conductive terminals with different polarities and a protrusion extending forwardly therefrom for abutting against the corresponding portion of the female connector to disconnect two conductive terminals with same polarity.

In an exemplary embodiment, the second male connector has four contacts corresponding to the conductive terminals, and four contacts are respectively and electrically connected to corresponding conductive terminals to connect two battery cell groups in parallel when two conductive terminals with same polarity are connected with each other.

In an exemplary embodiment, the female connector has a converter opposite to the conductive terminals, and the converter has a plurality of inner contacts, and each inner contact is simultaneously connected to two conductive terminals with same polarity, and two battery cell groups are connected with each other in parallel in the battery pack.

BRIEF DESCRIPTION OF THE DRAWINGS

The invention will now be described, by way of example, with reference to the accompanying drawings, in which.

DETAILED DESCRIPTION

The present invention will be described in detail below with reference to the drawings and specific embodiments.

FIG. 1 to FIG. 17 illustrate a power tool system in accordance with the present invention. The power tool system includes a first power tool with a high rated-voltage, a second power tool with a low rated-voltage and a battery pack 100 supplying power for both power tools when connected thereto. The first power tool (not shown) has a first male connector 45 electrically connected to the battery pack 100. The second power tool (not shown) includes a second male connector 46 electrically connected to the battery pack 100. The first power tool is powered by the battery pack 100 through the battery pack 100 being connected to the first male connector 45. The second power tool is powered by the battery pack 100 though the battery pack 100 being connected to the second male connector 46.

Figure 1:
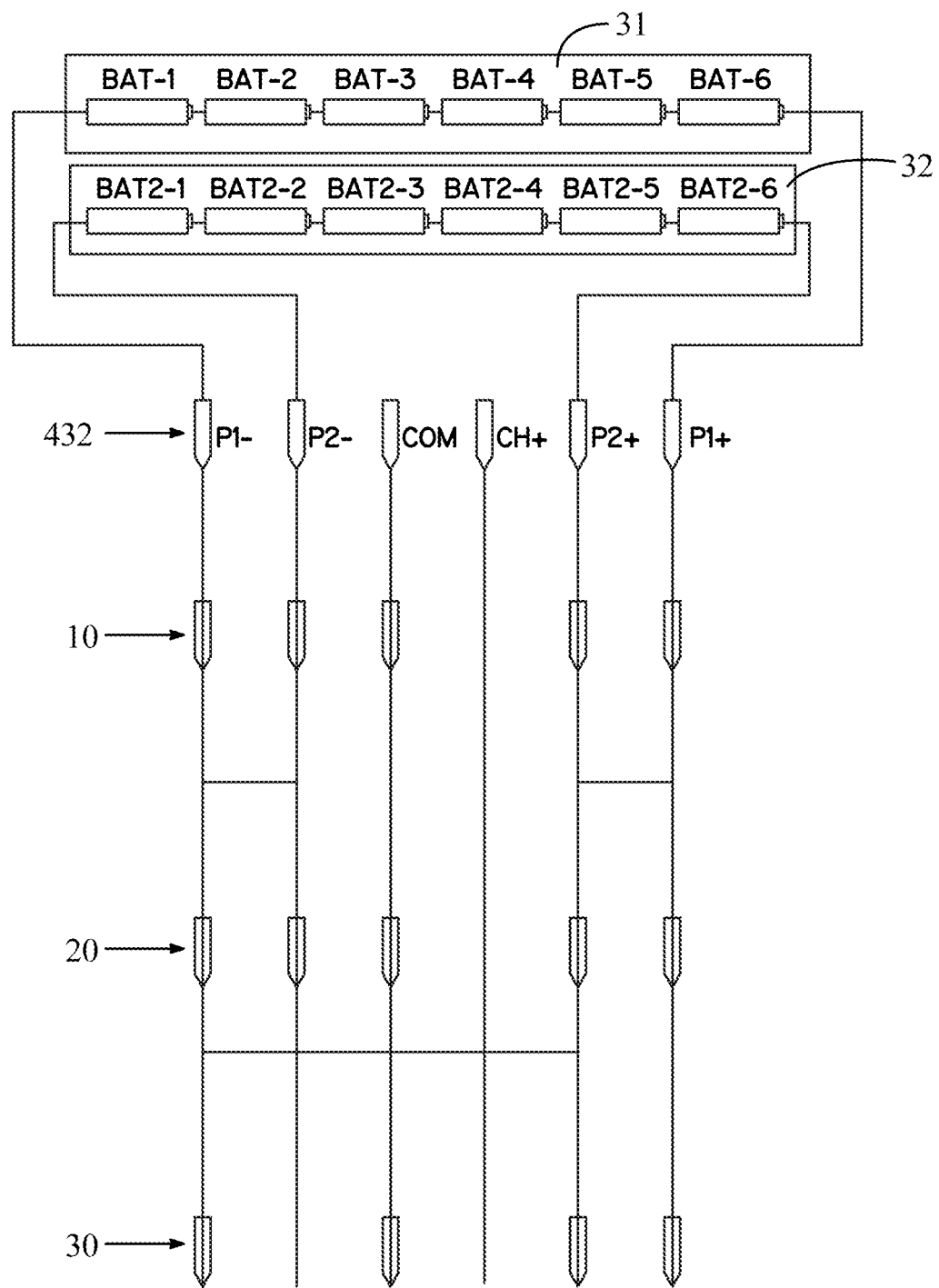
FIG. 1 is a schematic diagram of a traditional dual-voltage electrical system.
Figure 2:
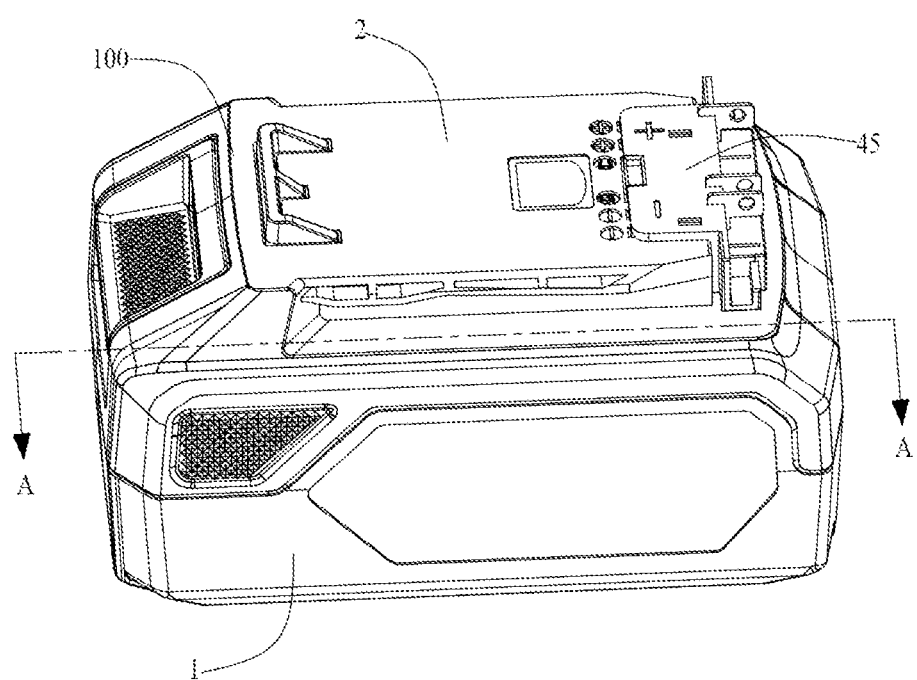
FIG. 2 is an assembled and perspective view of a power tool system in accordance with an embodiment of present invention, showing a battery pack being connected with a first male connector of a high rated-voltage power tool.
Figure 3:
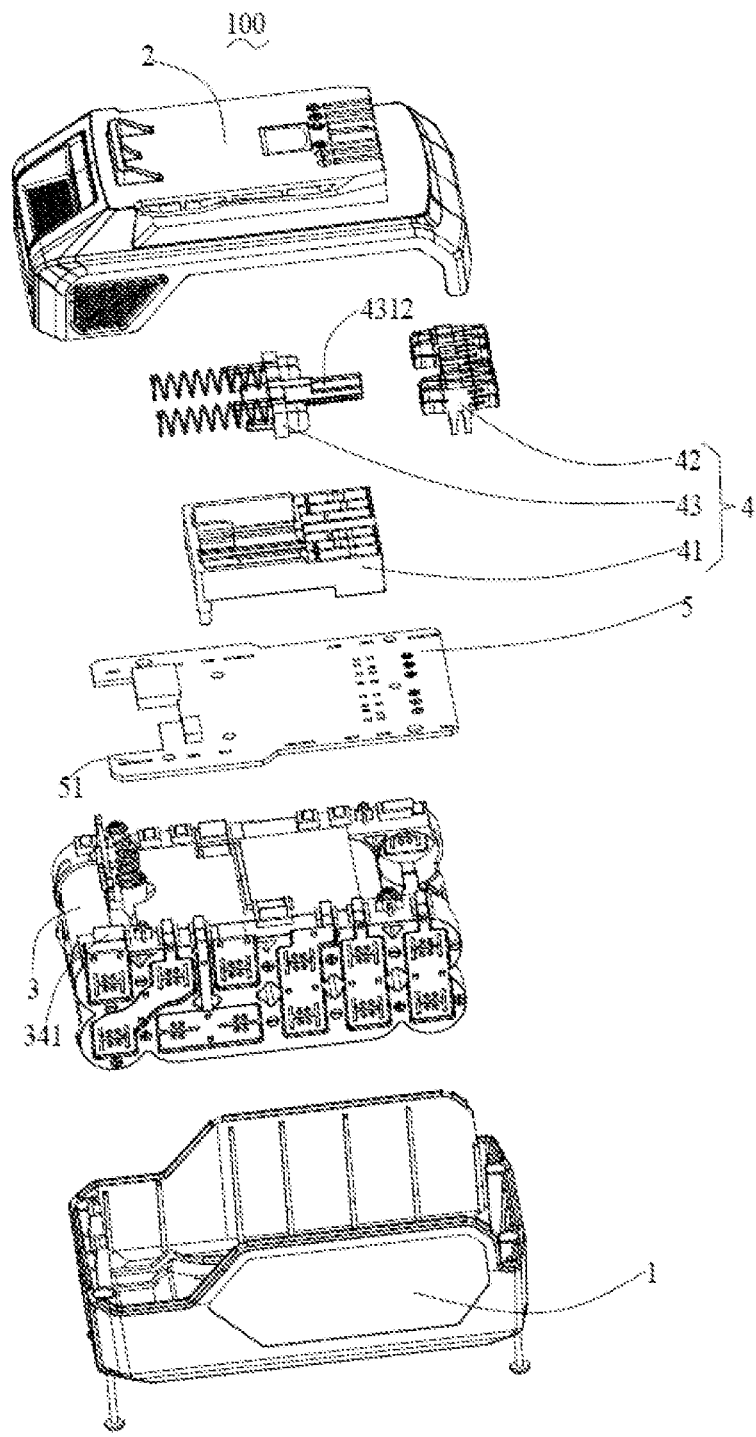
FIG. 3 is an exploded and perspective view of the battery pack of the power tool system shown in FIG. 2.
Figure 4:
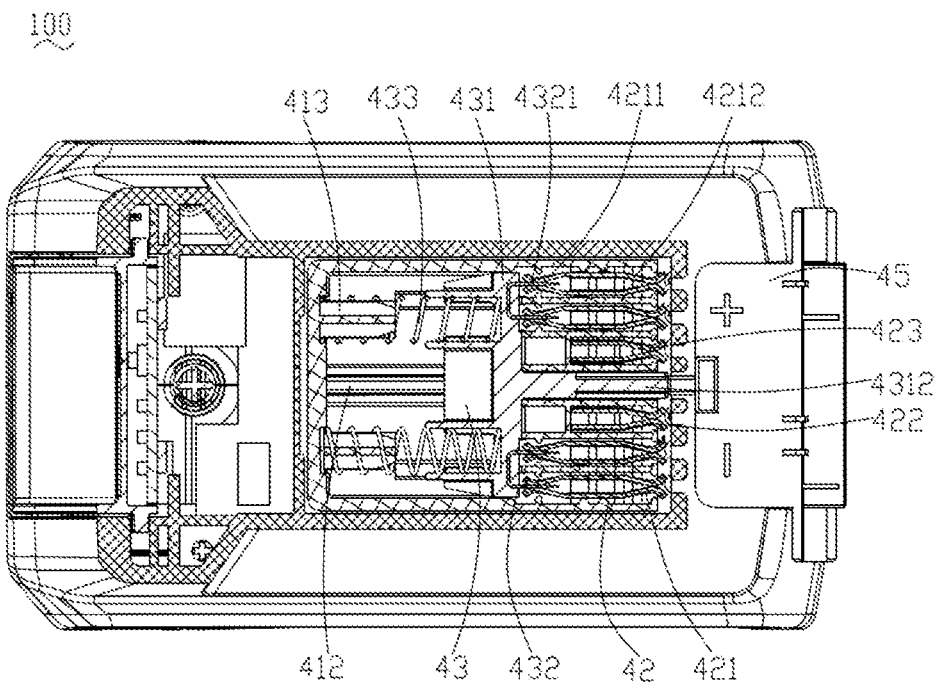
FIG. 4 is a sectional view of the power tool system along A-A direction shown in FIG. 2.
Figure 5:
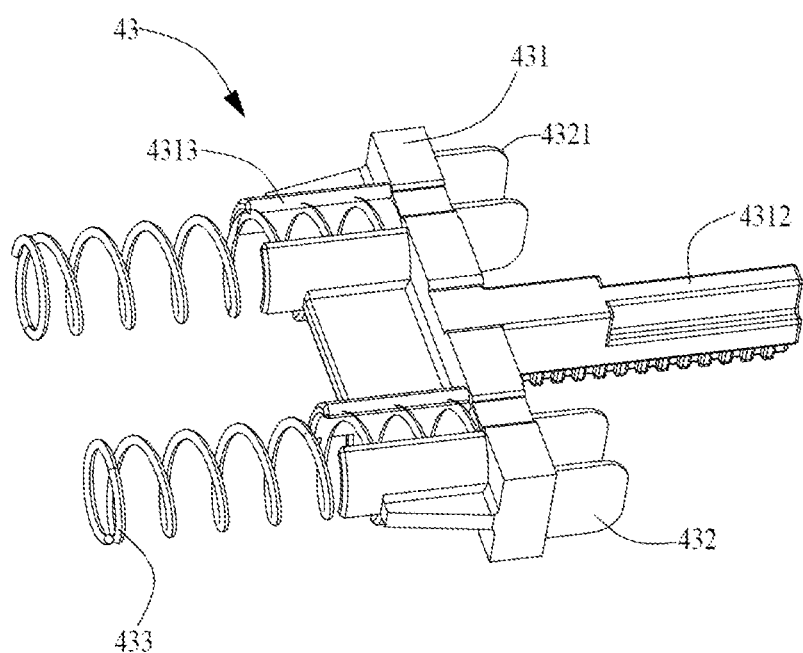
FIG. 5 is an assembled and perspective view of a converter of a female connector of the battery pack shown in FIG. 2.
Figure 6:
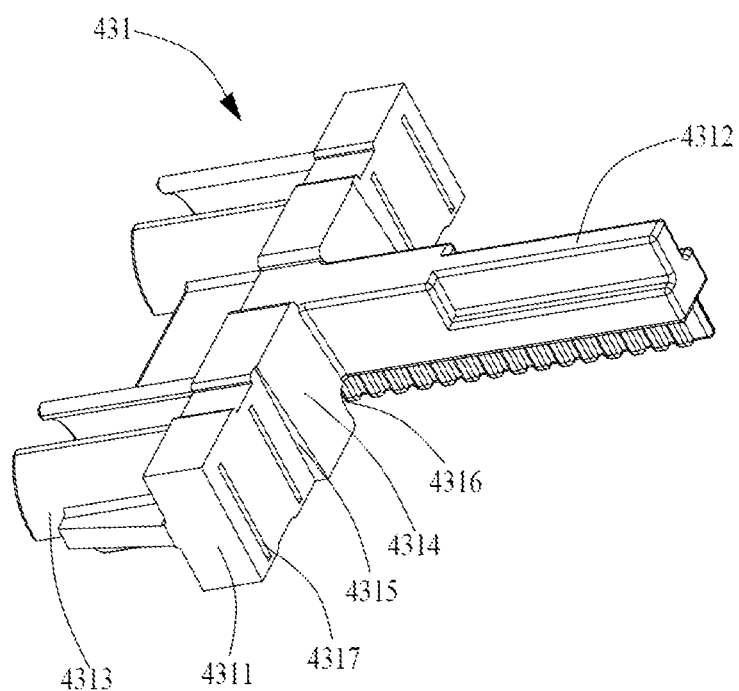
FIG. 6 is another perspective view of a main body of the converter in FIG. 5.

Referring to FIG. 2, the battery pack 100 includes a lower cover 1, an upper cover 2 mounted on the lower cover 1, a battery module 3 received in a receiving space formed between the lower cover 1 and the upper cover 2, a printed circuit board 5 assembled to the battery module 3 and a female connector 4 electrically connected to the battery module 3 through the PCB 5.

Referring to FIG. 9 to FIG. 14, the battery module 3 includes two battery cell groups 31, 32 and a cell holder 33 for housing two battery cell groups 31, 32. Each battery cell group 31, 32 has a plurality of cells 311 connected with each other in series and a plurality of nickel strips 34 respectively connected to the positive and negative electrodes thereof. Each nickel strip 34 has a convex tab 341 protruding upwardly and passing through a hole 51 of the PCB 5. The convex tab 341 is soldered to the PCB 5 to achieve the electrical connection between corresponding battery cell group 31, 32 and the PCB 5. Two battery cell groups 31, 32 are electrically connected to the female connector 4 through electrically connecting the convex tab 341 of the nickel strip 34 to the female connector 4 by the PCB 5, so as to achieve the electrical connection between the female connector 4 and the battery module 3. Each battery cell group 31, 32 has a "n" voltage. The battery module 3 can output a "n" voltage when two battery cell groups 31, 32 are connected with each other in parallel and a "2n" voltage when two battery cell groups 31, 32 are connected with each other in series. The cell holder 33 has a diameter larger than that of the cell 311. Each cell holder 33 has four guiding portion 331 for guiding the cell 311 thereinto. Each guiding portion 331 has a chamfer 3311 located at the end thereof for easily inserting the cell 311 into the cell holder 33.

Referring to FIG. 4 to FIG. 8, the female connector 4 electrically connected to the first or second male plug 45, 46 for supplying power to corresponding power tools includes a housing 41 mounted upon the battery module 3 through the PCB 5, a plurality of terminals 42 received in the housing 41, and a converter 43 retained in the housing 41 for switching the electrical connection of two battery cell groups 31, 32 in two states. One is parallel connected state, and the other is isolated state.

Figure 8:
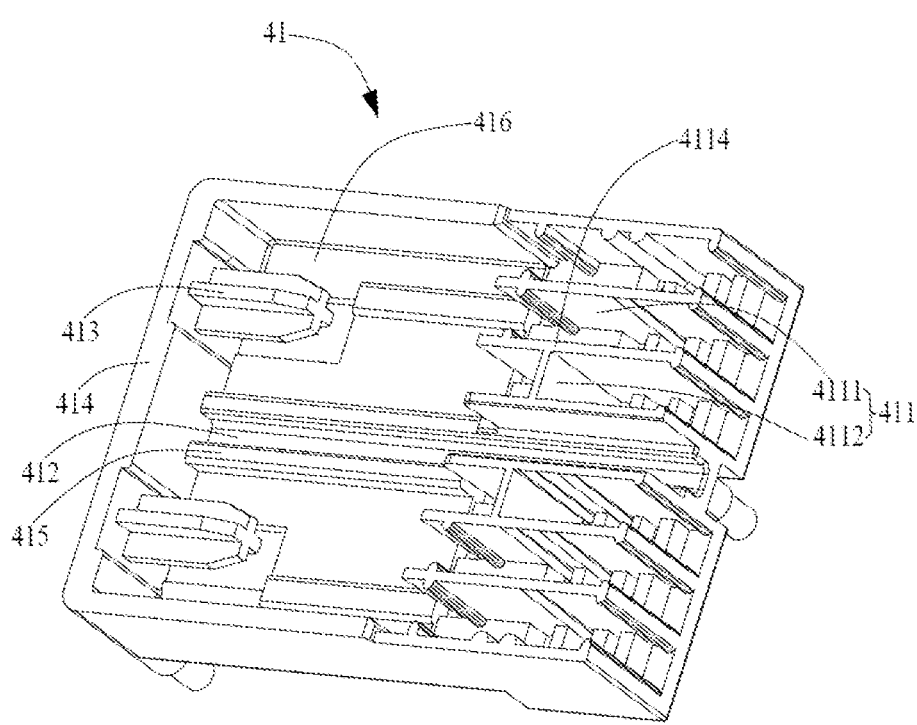
FIG. 8 is a perspective view of a housing of the female connector of the battery pack shown in FIG. 2.
Figure 9:
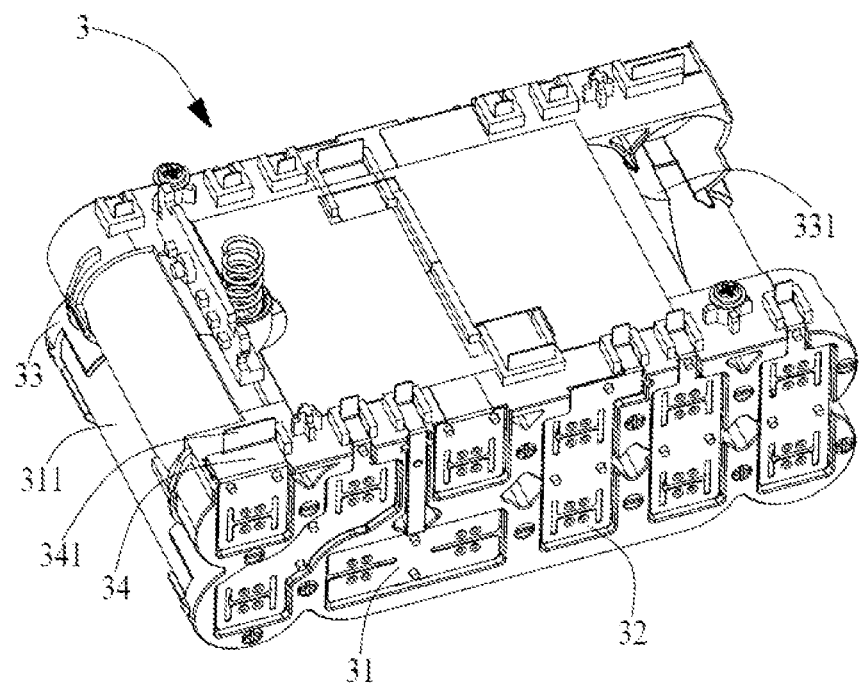
FIG. 9 is a perspective view of a battery module of the battery pack shown in FIG. 2.
Figure 10:
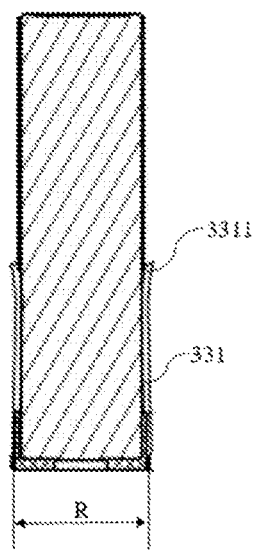
FIG. 10 is a sectional view of a cell holder of the battery module shown in FIG. 9.
Figure 11:
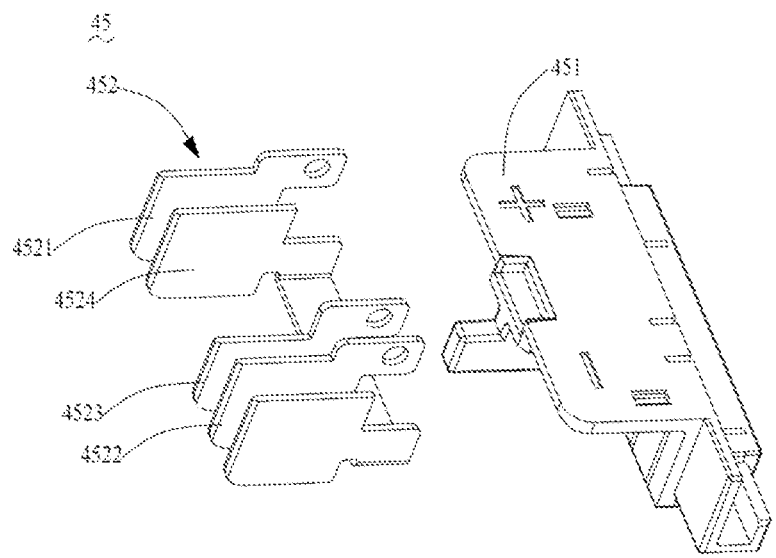
FIG. 11 is an exploded and perspective view of the first male connector of the high rated-voltage power tool shown in FIG. 2.
Figure 12:
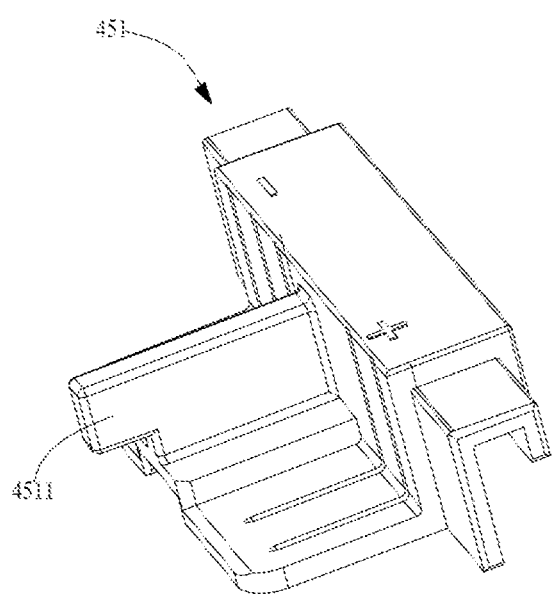
FIG. 12 is a perspective view of a base of the first male connector in FIG. 11.
Figure 13:
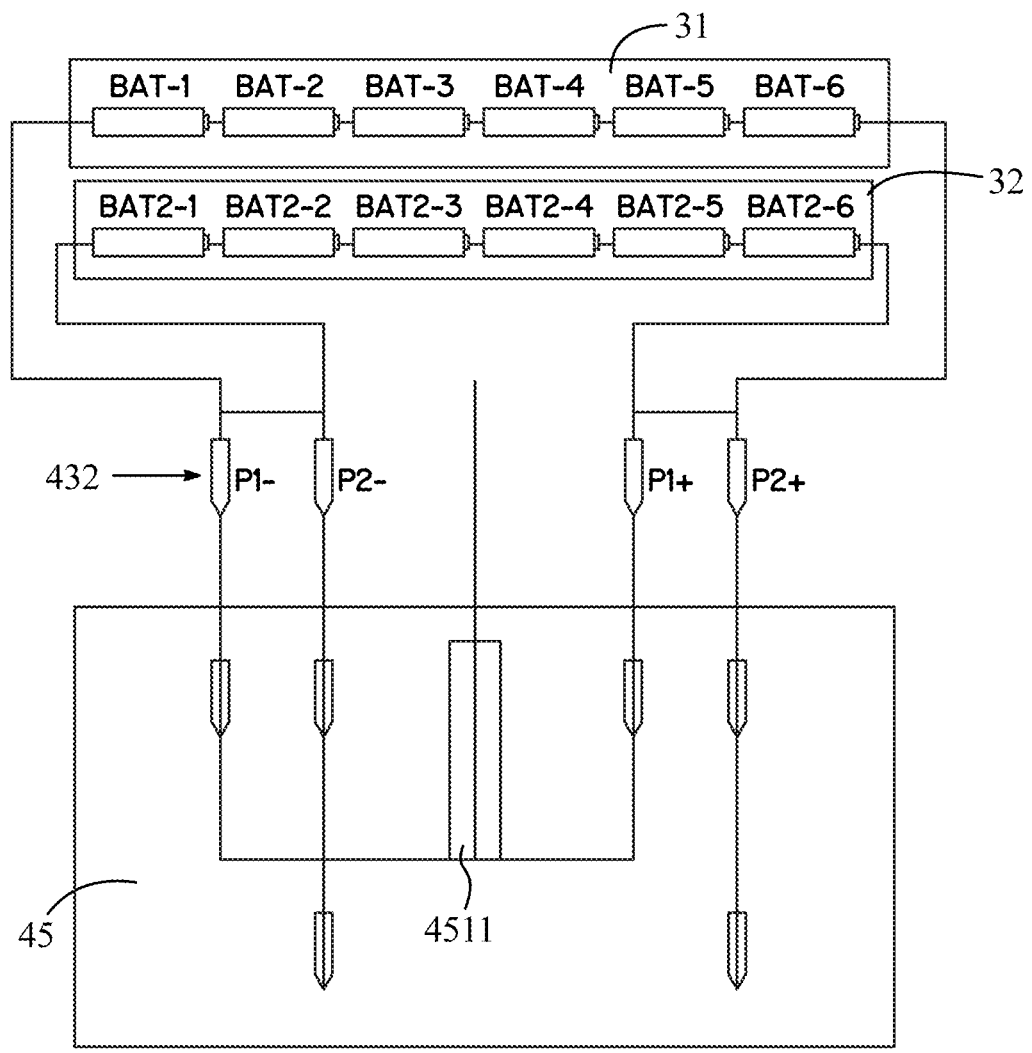
FIG. 13 is a schematic diagram of an electrical connection between the battery pack and the high rated-voltage power tool, showing an initial state of a circuit connection within the battery pack when the first male connector begins to engage with the female connector.
Figure 14:
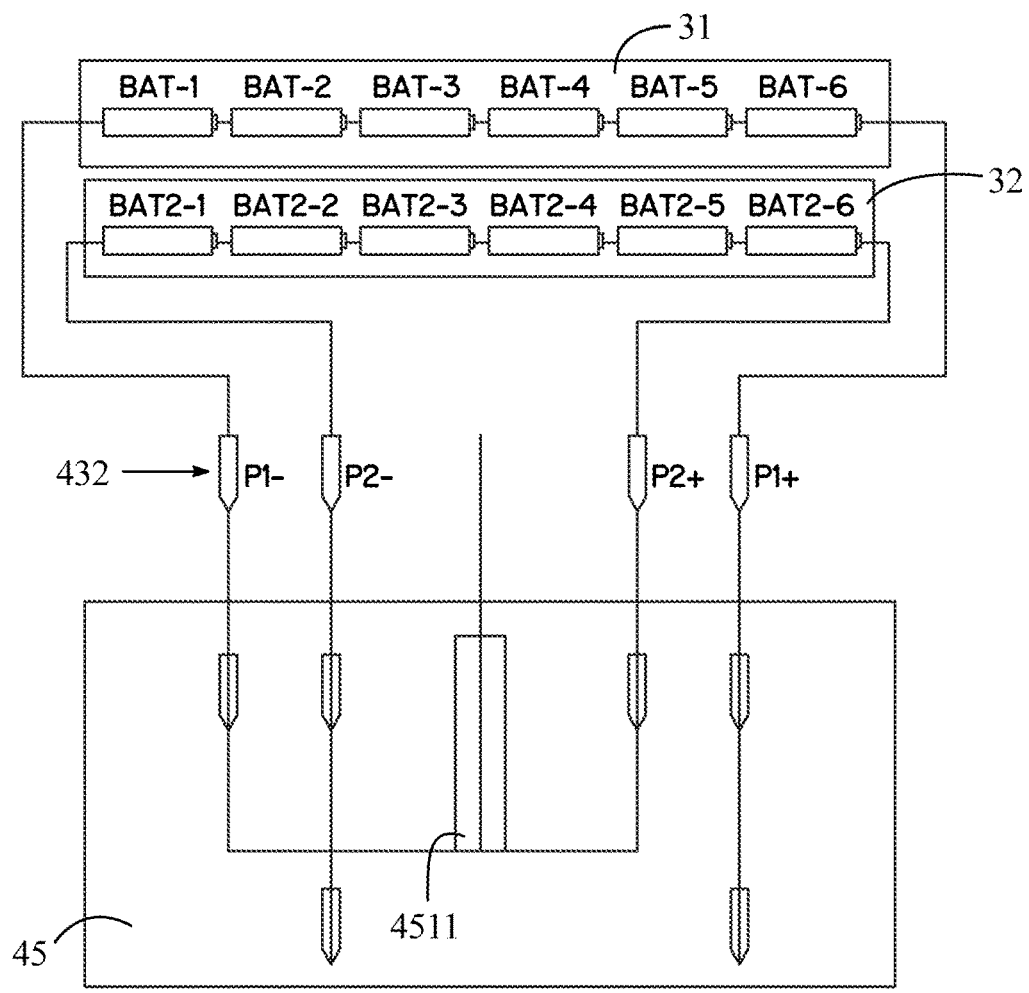
FIG. 14 is also a schematic diagram of the electrical connection between the battery pack and the high rated-voltage power tool, showing a final state of a circuit connection within the battery pack when the first male connector is connected to the female connector.

Referring to FIG. 8, the housing 41 configured with a rectangular shape has an accommodating space 416 surrounded by three sidewalls thereof and a plurality of terminal receiving slots 411 opposite to the accommodating space 416. The accommodating space 416 is depressed from the top of the housing 41 for receiving the converter 43. The terminal receiving slots 411 horizontally extend along a length direction of the housing 41 for respectively receiving the terminals 42. The receiving slots 411 are configured with two different structures, one is the first receiving slots 411 and communicated with the accommodating space 416. The other is the second receiving slot 4112 and separated with the accommodating space 416. A pairs of positioning columns 413 horizontally extend from the sidewall 414 of the housing 41 towards the accommodating space 416. The housing 41 defines a guiding rail 412 for guiding the converter 43 move along a front-to-rear direction in the accommodating space 416. The guiding rail 412 extends along the length direction of the housing 41. The guiding rail 412 passes through the accommodating space 416 and located in the middle of the receiving slots 411. A pair of ribs 415 are disposed at two opposite sides of the guiding rail 412 for preventing the converter 43 from separating with the housing 41.

Figure 7:
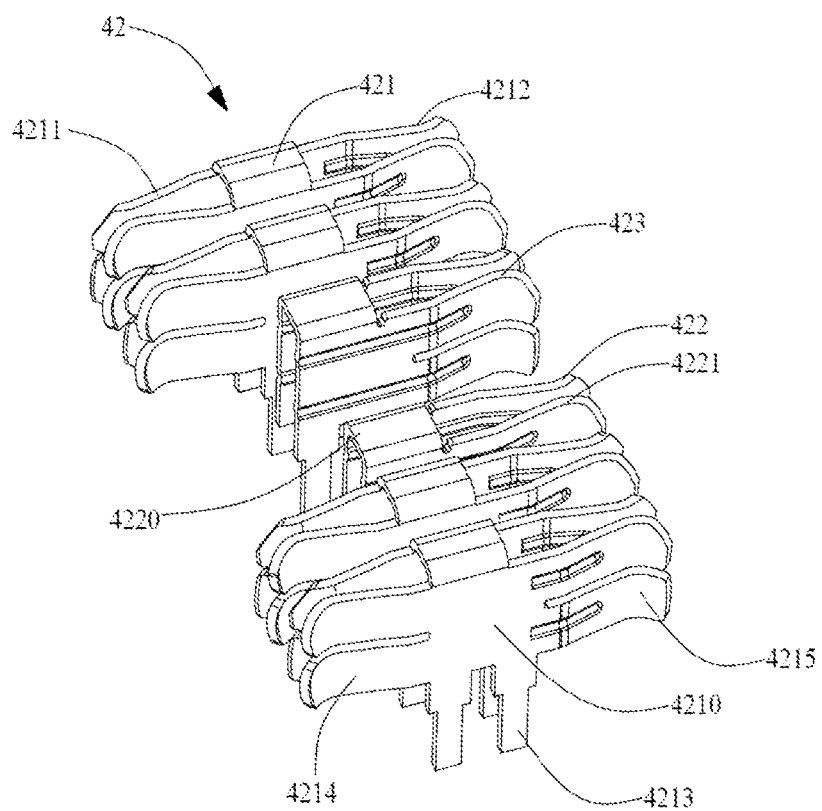
FIG. 7 is a perspective view of terminals of a female connector of the battery pack shown in FIG. 2.

Referring to FIG. 7, the terminals 42 received in the housing 41 for achieving the electrical connection between the first or second male connector 45, 46 and the battery module 3 includes two pair of conductive terminals 421, one communication terminal 422 and one charging terminal 423 disposed in the same row. The conductive terminals 421 are received in the first receiving slots 4111 of the housing 41. The communication and charging terminals 422, 423 received in the second receiving slot 4112 of the housing 41 are adjacently disposed in the middle of the terminals 42. The communication terminal 422 disposed in the middle of four conductive terminals 421 are electrically connected to the PCB 5 for achieving the communication between the battery pack 100 and the power tools connected to the battery pack 100. The charging terminal 423 is used for charging the battery pack 200 when the battery pack 100 is connected to an external charging device (not shown). And two pair of conductive terminals 421 are respectively located at two opposite sides of the communication and charging terminals 422, 423. The conductive terminals 421 located at the same side of the communication and charging terminals 422, 423 have same polarity. The conductive terminals 421 disposed at two opposite sides of the communication and charging terminals 422, 423 have different polarities. Four conductive terminals 421 are configured with same structure. The communication and charging terminals 422, 423 are configured with same structure but different with that of the conductive terminals 421. Four conductive terminals 421 are respectively and electrically connected to positive or negative electrodes of corresponding battery cell groups 31, 32 through the PCB 5 electrically connecting the conductive terminals 421 to corresponding convex tabs 341 of the battery module 3.

Each conductive terminal 421 has a U-shaped main portion 4210, a pair of contacting arms 4211 extending backwardly from the main portion 4210, a pair of clamping arms 4212 extending forwardly from the main portion 4210, and a plurality of soldering pins 4213 extending downwardly from the main portion 4210. Two contacting arms 4211 are disposed at two opposite ends of the main portion 4210 and located at the same side of the main portion 4210. Each contacting arm 4211 extends horizontally from corresponding end of the main portion 4210 and defines a pair of contacting ends 4214 branched at the end thereof. Two clamping arms 4212 are disposed at another two opposite ends of the main portion 4210 and located at the other same side of the main portion 4210. Each clamping arm 4212 extends horizontally form corresponding end of the main portion 4210 and defines a pair of clamping ends 4215 branched at the end thereof. Two clamping arms 4212 and two contacting arms 4211 are disposed at two opposite sides of the main portion 4210. The soldering pins 4213 are soldered to the PCB 5 to achieve the electrical connection between the female connector 4 and the battery module 3 when inserted into the PCB 5. The contacting arms 4211 can be connected to the converter 43 to achieve the parallel connection of two battery cell groups 31, 32. The clamping arms 4212 can be connected to the first or second male connector 45, 46 to achieve the electrical connection between the battery pack 100 and the corresponding power tool. Two battery cell groups 31, 32 can be switched between parallel connected state and isolated state through the contacting arms 4211 of the terminals 42 connected or disconnected to the converter 43.

The communication terminal 422 has a U-shaped base portion 4220, a pair of connecting arms 4221 extending forwardly from the base portion 4220 and a plurality of contacting pins 4222 extending downwardly from the bottom of the base portion 4220. The connecting arms 4221 horizontally extends from two opposite ends of the base portion 4220 and are disposed at the same side of the base portion 4220. The connecting arms 4221 can achieve the communication function between the battery pack 100 and the corresponding power tools when connected to the corresponding male connector 45, 46. The contacting pins 4222 are soldered to the PCB 5 to achieve the electrical connection between the communication terminal 422 and the battery module 3. The arms 4221 of the communication terminal 422 are located at the same side with the clamping arms of the conductive terminals 421.

Referring to FIG. 3 to FIG. 6, the converter 43 slidably assembled in the housing 41 and can slide along the guiding rail 412 of the housing 41 in the inserting direction of the first or second male connector 45, 46. The converter 43 has a main body 431, a pair of inner contacts 432 horizontally received in the main body 431, and a pair of elastic members 433 sandwiched between the main body 431 and the sidewall 414 of the housing 41. The main body 431 sliding along the length direction of the housing 41 has a base 4311 for housing the inner contacts 432, a protruding portion 4312 and a pair of posts 4313 respectively extending from two opposite sides of the base 4311. The base 4311 extends along a width direction of the battery pack 100. The protruding position 4312 and the posts 4313 are respectively located at two opposite sides of the base 4311. The protruding portion 4312 and two posts 4313 extend away from each other. The protruding portion 4312 extends towards the terminals 42 from the middle of the base 4311. The protruding portion 4312 can slide in the guiding rail 412 of the housing 41 along a front-to-back direction and can be prevented from separating with the housing 41 by two ribs 415. Two posts 4313 are horizontally located at two opposite ends of the base 4311 and configured with a hollow cylindrical shape for receiving the elastic member 433.

Each elastic member 433 is sandwiched between the inner wall of corresponding post 4313 and the sidewall 414 of the housing 41. The converter 43 can slide away from the terminals 42 along the length direction of the housing 41 under the driving of the protruding portion 4312 when external force is applied to the protruding portion 4312, so as to disconnect the inner contacts 432 to the conductive terminals 421. Therefore, two battery cell groups 31, 32 are in isolated state when the inner contacts 432 are not clamped by the contacting ends 4214 of the conductive terminals 421. When the external force is applied to the protruding portion 4312, the main body 431 moves backwardly and away from the terminals 42, the elastic members 433 are compressed by the main body 431 and has elastic deformation. When the external force is not applied to the protruding portion 4312, the main body 431 moves forwardly along the guiding rail 412 of the housing 41 under the elastic force caused by the elastic member 433 recovering from elastic deformation and the inner contacts 432 can be clamped by two contacting arms 4211 of the terminals 42, so as to connect two pair of conductive terminals 421 with same polarity in parallel, therefore, two battery cell groups 31, 32 are connected with each other in parallel.

Preferably, the main body 431 has an anti-flip portion 4314 adjacently disposed at two opposite sides of the protruding portion 4312. The anti-flip portion 4314 inclinedly protrudes from the base 431 and has a right-triangle side surface 4315 for abutting corresponding sidewall of the receiving slot 411. A groove 4316 formed on the bottom of the main body 431 is adjacent to the protruding position 4312. The main body 431 also defines a pair of U-shaped receiving passages 4317 for receiving corresponding inner contacts 432. Each inner contact 432 configured with a U-shape defines a pair of connecting arms 4321 horizontally extending towards the corresponding terminals 42. Each connecting arm 4321 of the inner contact 432 is the provided with a rounded corner, so as to easily and quickly engage with or separate from corresponding connecting ends 4214 of the contacting arms 4211 of the conductive terminals 421, so that corresponding conductive terminals 421 can be connected with each other in parallel or isolated to each other. Therefore, two battery cell groups 31, 32 can be switched between parallel connected state and isolated state through the connecting arms 4321 of the inner contacts 432 clamped or not clamped by the contacting ends 4214 of the conductive terminals 421. In initial state, the connecting arms 4321 are clamped by the contacting ends 4214 of conductive terminals 421 and two battery cell group 31, 32 are in parallel connected state, and the battery pack 100 can output a "n" voltage, referring to FIG. 17.

FIG. 11 to FIG. 14 illustrate a first male connector 45 of the first power tool with high rated-voltage. The first male connector 45 coupled to the female connector 4 of the battery pack 100 for supplying a high voltage for the first power tool includes a first body 451 and a plurality of first contacts 452 received in the first body 451. The first body 451 also has a protrusion 4511 horizontally extending forward from a bottom thereof. The protrusion 4511 has a length longer then the first body 451 and can abut against the protruding portion 4312 to drive the protruding portion 4312 of the converter 43 move backwardly along the guiding rail 412 of the housing 41 to separate the inner contacts 432 from the conductive terminals 421. The electrical connection between the converter 43 and the conductive terminal 421 are changed from parallel connected state to isolated state. The first contacts 452 disposed in the first body 451 from left to right include two conducting terminals 4521, 4522, a communicating terminal 4523 and a connecting terminal 4524. Two conducting terminals 4521, 4522 each configured with one contacting arm and can be respectively clamped by corresponding clamping ends 4215 of corresponding conductive terminals 422, so as to achieve the electrical connection between the first power tool and the battery pack 100. The connecting terminal 4524 is configured with two contacting arms branched at the end thereof for connecting another two conductive terminals 421 with different polarities together, so as to connect two battery cell groups 31, 32 with each other in series when the first male connector 45 is coupled to the female connector 4 of the battery pack 100. So that the battery pack 100 can output a high voltage to the first power tool through the electrical connection between the female connector 4 and the first male connector 45. The communicating terminal 4523 is clamped by the connecting arms 4221 of the communication terminal 422 to achieve the communication between the first power tool and the battery pack 100.

Figure 15:
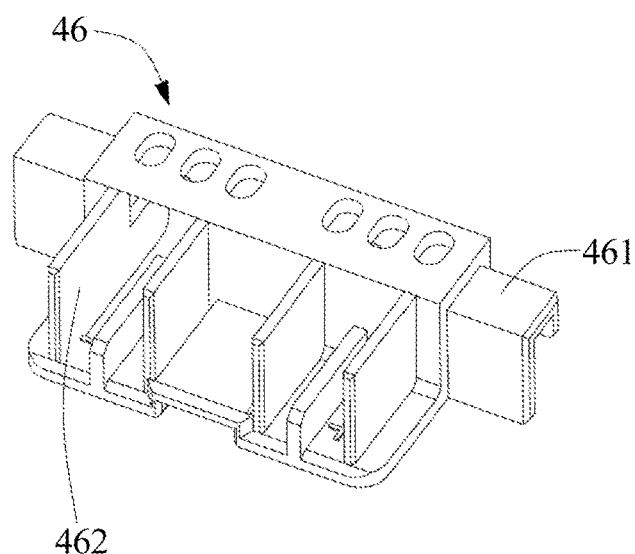
FIG. 15 is a perspective view of a second male connector of a low rated-voltage power tool in accordance with the present invention.
Figure 16:
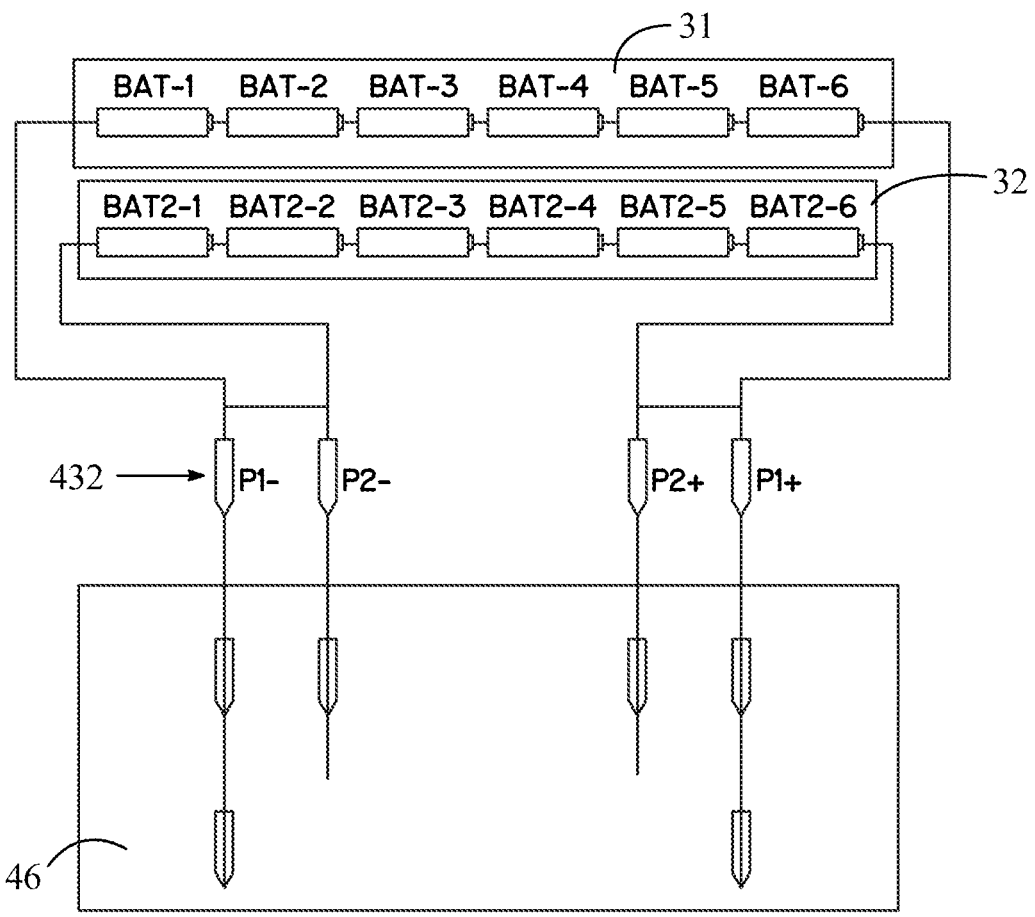
FIG. 16 is a schematic diagram of an electrical connection between the battery pack and the low rated-voltage power tool, showing a circuit connection within the battery pack when the second male connector is connected to the female connector.
Figure 17:
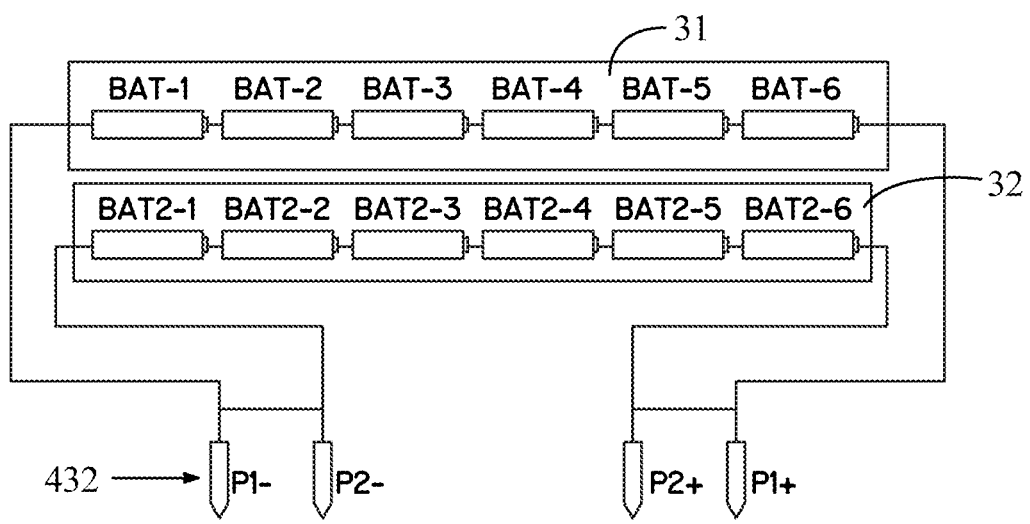
FIG. 17 is a schematic diagram of a circuit connection between the inner contacts of the converter and two battery cell groups of the battery pack in accordance with the present invention.

Referring to FIG. 15 and FIG. 16, a second male connector 46 of the low rated-voltage power tool includes a second body 461 and a plurality of second contacts 462 received in the second body 461. The second contacts 462 includes four contacts each defining one contacting arm clamped by the clamping arms 4212 of the conductive terminals 421 when the battery pack 100 is coupled to the second power tool. And the connecting arms 4321 of the inner contact 432 are respectively clamped by corresponding contacting arms 4211 of the conductive terminals 421 with same polarity, so that the battery pack 100 outputs a low voltage to the second power tool through the clamping arms 4212 of the conductive terminals 421 respectively clamping the contacting arm of the second contacts 462 of the second male connector 46.

The electrical connection between two battery cell groups 31, 32 of the battery module 3 can be switched between parallel connected state and isolated state through the protruding portion 4312 of the converter 43 to move forwardly or backwardly along the guiding rail 412 of the housing 41 in a length direction of the housing 41 to connect or disconnect the inner contacts 432 of the converter 43 to the conductive terminals 42, so that the battery pack 100 can output a high voltage through connecting two battery cell groups 31, 32 in series when the inner contacts 432 are separate from the conductive terminals 421 and output a low voltage through connecting two battery cell groups 31, 32 in parallel when the inner contacts 432 are connected to the conductive terminals 421.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features maybe have in different claims, these may possibly advantageously be combined, and the inclusion in different claims does not imply that a combination of features is not feasible and/or advantageous. In addition, singular references do not exclude a plurality. The terms "a", "an", "first", "second" etc., do not preclude a plurality. Reference signs in the claims are provided merely as a clarifying example and shall not be construed as limiting the scope of the claims in any way.

The invention claimed is:

1. A battery pack, comprising:
a lower cover;
an upper cover mounted on the lower cover;
a battery module received in a receiving space formed between the upper and lower covers and having two battery cell groups, each battery cell group including a plurality of battery cells electrically connected in series, and each battery cell group having a positive electrode and a negative electrode;
a circuit board assembled to the battery module and electrically connected to the positive and negative electrodes of the two battery cell groups;
a female connector, including a housing, mounted to the circuit board, and having a plurality of positive conductive terminals respectively electrically connected to the positive electrodes of the two battery cell groups and a plurality of negative conductive terminals respectively electrically connected to the negative electrodes of the two battery cell groups; and
a converter including a main body, a plurality of elastic members, a positive contact configured to electrically connect the positive conductive terminals together, and a negative contact configured to electrically connect the negative conductive terminals together;
wherein the electrical connection of the two battery cell groups can be switched between a parallel connected state and an isolated state,
switching to the parallel connected state includes electrically connecting the positive conductive terminals together by connecting the positive contact to the positive conductive terminals and electrically connecting the negative conductive terminals together by connecting the negative contact to the negative conductive terminals,
switching to the isolated state includes electrically disconnecting the positive conductive terminals by disconnecting the positive contact from the positive conductive terminals and electrically disconnecting the negative conductive terminals by disconnecting the negative contact from the negative conductive terminals,
the housing defines a plurality of positioning columns extending towards the conductive terminals from a sidewall thereof, and
the main body has a plurality of posts extending therefrom, and wherein each elastic member is sandwiched between the corresponding positioning column and corresponding post.

2. The battery pack according to claim 1, wherein the converter slides towards the conductive terminals or away from the conductive terminals to electrically connect the conductive terminals with same polarity or electrically disconnect the conductive terminals with same polarity.

3. The battery pack according to claim 2, wherein
the conductive terminals are received in the housing and are respectively electrically connected to the positive and negative electrodes of the two battery cell groups through the circuit board, and
the converter is slidably assembled in the housing opposite to the conductive terminals.

4. The battery pack according to claim 3, wherein the converter includes a main body and the contacts are received in the main body, and
each contact is simultaneously connected to two conductive terminals with the same polarity in the parallel connected state.

5. The battery pack according to claim 4, wherein the contacts are disconnected from the conductive terminals to electrically isolate the two battery cell groups when the main body is driven to move away from the conductive terminals.

6. The battery pack according to claim 4, wherein the plurality of elastic members are sandwiched between the main body and a sidewall of the housing,
the elastic members are compressed and deformed when the main body is driven to move away from the conductive terminals, and
the main body moves towards the conductive terminals under the elastic force caused by the elastic members recovering from elastic deformation.

7. The battery pack according to claim 6, wherein the contacts are electrically connected with the conductive terminals when the main body is driven to move towards the conductive terminals and are electrically disconnected from the conductive terminals when the main body is driven to move away from the conductive terminals.

8. The battery pack according to claim 6, wherein the housing has a guiding rail extending along a lengthwise direction thereof for guiding the converter move towards or away from the conductive terminals.

9. The battery pack according to claim 8, wherein the main body has a protruding portion corresponding to the guiding rail of the housing,
the protruding portion forwardly extending from the main body, and
a pair of ribs are formed in the housing and located at two opposite sides of the guiding rail.

10. The battery pack according to claim 9, wherein the posts are configured with a hollow cylinder shape for receiving one end of the elastic members,
the other end of the elastic members surrounds the corresponding positioning column and abuts against a sidewall of the housing, and
the posts and the protruding portion are located at two opposite sides of the main body.

11. The battery pack according to claim 4, wherein each conductive terminal has a contacting portion configured to electrically connect with the respective contact and a clamping portion disposed opposite to the contacting portion, and Each contact is simultaneously connected with the contacting portions of two adjacent conductive terminals with the same polarity in the parallel connected state.

12. The battery pack according to claim 11, wherein the contacting portions include contacting arms, the clamping portions include clamping arms, the clamping portion is the clamping arm opposite to the contacting arm, each contact defines a pair of connecting arms, and each connecting arm is respectively connected with a corresponding contacting arm of corresponding conductive terminals in the parallel connected state.

13. The battery pack according to claim 5, wherein the conductive terminals are disposed from left to right, the positive conductive terminals are located adjacent to one another, the negative conductive terminals are located adjacent to one another, and each conductive terminal defines a contacting pin extending downwardly therefrom for being soldered to the circuit board.

* * * * *